US008424942B2

(12) United States Patent
Park et al.

(10) Patent No.: US 8,424,942 B2
(45) Date of Patent: Apr. 23, 2013

(54) INDUSTRIAL GRIPPER WITH MULTIPLE DEGREES OF FREEDOM

(75) Inventors: Hahn Park, Seongnam-si (KR); Sung Wook Jung, Suwon-si (KR); Jae Chul Hwang, Seoul (KR); Yong Won Choi, Yongij-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 12/926,869

(22) Filed: Dec. 14, 2010

(65) Prior Publication Data

US 2011/0148132 A1    Jun. 23, 2011

(30) Foreign Application Priority Data

Dec. 21, 2009 (KR) .................. 10-2009-0128151

(51) Int. Cl.
*B66C 1/00* (2006.01)
*B66C 1/42* (2006.01)

(52) U.S. Cl.
USPC ............................................ 294/106; 901/38

(58) Field of Classification Search .............. 294/106, 294/213; 901/38; 623/64
See application file for complete search history.

(56) References Cited

U.S. PATENT DOCUMENTS

| 5,108,140 | A | * | 4/1992 | Bartholet | 294/106 |
|-----------|---|---|--------|-----------|---------|
| 5,501,498 | A | * | 3/1996 | Ulrich | 294/106 |
| 5,762,390 | A | * | 6/1998 | Gosselin et al. | 294/106 |
| 6,505,870 | B1 | * | 1/2003 | Laliberte et al. | 294/106 |
| 6,669,257 | B2 | * | 12/2003 | Laliberte et al. | 294/106 |
| 6,918,622 | B2 | * | 7/2005 | Kim et al. | 294/106 |

* cited by examiner

*Primary Examiner* — Dean Kramer
*Assistant Examiner* — Stephen Vu
(74) *Attorney, Agent, or Firm* — Staas & Halsey LLP (57) ABSTRACT

An industrial gripper includes a base plate, at least three finger units to be moved relative to the base plate, a supporting unit to support the finger units, a first drive unit coupled to the supporting unit to allow simultaneous angular displacement of the finger units toward an object, and a second drive unit coupled to the supporting unit to adjust orientation angles between the finger units. Each of the finger units includes an intermediation member to be moved in a first direction by the first drive unit, a grip member to grip the object by being moved in a second direction different from the first direction as a movement direction of the intermediation member, and a connection member to convert the first direction movement of the intermediation member into the second direction movement of the grip member.

14 Claims, 6 Drawing Sheets

INDUSTRIAL GRIPPER WITH MULTIPLE DEGREES OF FREEDOM

CROSS-REFERENCE TO RELATED APPLICATIONS

This application claims the benefit of Korean Patent Application No. 2009-0128151, filed on Dec. 21, 2009 in the Korean Intellectual Property Office, the disclosure of which is incorporated herein by reference.

BACKGROUND

1. Field

Embodiments relate to an industrial gripper with multiple degrees of freedom to stably grip products with various shapes and strengths in response to diversity of products used in industrial fields.

2. Description of the Related Art

Recently, as the lifespan and use period of products decrease and the diversity of demands of customers who use the products increases, there is an increasing need for production methods to flexibly deal with multiple kinds of products, differently from the conventional mass-production of one kind of product.

Accordingly, a variety of equipment used in industrial fields may need flexibility to deal with multiple kinds of products.

Industrial grippers have been currently used in mass-production facilities and have simplified configurations to deal with a limited variety of products which have the same or similar shape, but have different sizes.

Industrial grippers generally have one degree of freedom for grip stability and are designed to grip a product via a simple linear motion. Therefore, the shape of products that may be gripped by industrial grippers is limited. Even if it is attempted to grip complicated shapes of products, stably gripping the products may be impossible due to structural constraints.

In conclusion, the above described limit in the shape of products to be gripped by industrial grippers may make it difficult to improve productivity and operation efficiency in industrial fields that may need to deal with multiple kinds of products.

Although robot hands similar to human hands have been developed, use of the robot hands entails significant cost burdens, and it may be difficult to apply robot hands to actual industrial fields in consideration of workability and reliability.

When it is attempted to grip an object in an industrial field by use of robot hands similar to human hands, the robot hands may clasp the object similar to action of human hands, but may fail to grip an accurate grip position of the object so that a specific portion of the object is exposed.

SUMMARY

Therefore, it is an aspect to provide an industrial gripper with multiple degrees of freedom to stably grip various shapes of products in response to diversity of products used in industrial fields.

Additional aspects will be set forth in part in the description which follows and, in part, will be apparent from the description, or may be learned by practice of the invention.

In accordance with one aspect, an industrial gripper with multiple degrees of freedom includes a base plate, at least three finger units to be moved relative to the base plate, a supporting unit to support the finger units, a first drive unit coupled to the supporting unit to allow simultaneous angular displacement of the finger units toward an object, and a second drive unit coupled to the supporting unit to adjust orientation angles between the finger units, wherein each of the finger units includes an intermediation member to be moved in a first direction by the first drive unit, a grip member to grip the object by being moved in a second direction different from the first direction as a movement direction of the intermediation member, and a connection member to convert the first direction movement of the intermediation member into the second direction movement of the grip member.

The first direction may be a vertical direction of the base plate, and the second direction may be a horizontal direction of the base plate.

The grip member may include a grip piece to be moved by the first drive unit while being kept in the horizontal direction of the base plate.

The connection member may include a fixing portion installed to the supporting unit, an opposite portion installed to the grip member so as to be opposite to the fixing portion, and a link portion consisting of a plurality of links to connect the intermediation member, the fixing portion and the opposite portion to one another.

The link portion may include a first drive link coupled to the intermediation member, a second drive link having one end coupled to one end of the first drive link, the other end coupled to a first point of the opposite portion and an angled portion coupled to a first point of the fixing portion, and a driving-assistant link having one end coupled to a second point of the fixing portion and the other end coupled to a second point of the opposite portion.

The second drive link, the driving-assistant link, the fixing portion and the opposite portion may define a parallelogram 4-bar link structure.

The first drive unit may include a first drive motor fixed to the supporting unit and a first power transmission member to transmit drive power of the first drive motor to the intermediation member.

The first drive unit may further include a sensing device installed to the first drive motor to monitor current of the first drive motor.

The first drive motor may include at least one of an electric motor, a pneumatic cylinder and a hydraulic cylinder.

The first power transmission member may include a first-A pulley coupled to the first drive motor, a first-B pulley coupled to the first-A pulley via a first belt, a ball screw assembly coupled to the first-B pulley, and a connection frame coupled to the ball screw assembly to transmit drive power for the first direction movement to the intermediation member.

The ball screw assembly may include a ball screw coupled to the first-B pulley, a ball nut screwed to the ball screw, and a linear guide coupled to the connection frame while being arranged parallel to the ball screw.

The second drive unit may include a second drive motor installed to the supporting unit, and a second power transmission member to transmit drive power of the second drive motor to two finger units of the finger units.

The second drive motor may include at least one of an electric motor, a pneumatic cylinder and a hydraulic cylinder.

The second power transmission member may include a second-A pulley coupled to the second drive motor, a second-B pulley coupled to the second-A pulley via a second belt, a first rotating shaft coupled to a fixing portion of any one finger unit and having the same rotation center as the second-B pulley, a driving gear coupled to the second-B pulley, a driven gear connected to the driving gear via an intermediation gear, and a second rotating shaft coupled to a fixing portion of the other finger unit and having the same rotation center as the driven gear.

The grip piece may include a first surface defining an upper stepped surface, a second surface defining a circular side surface near a lower end thereof, and a third surface defining a flat side surface connecting the first surface and the second surface to each other.

In accordance with another aspect, an industrial gripper with multiple degrees of freedom includes a base plate, three finger units to be moved relative to the base plate, a supporting frame to support the finger units coupled thereto, a first drive unit coupled to the supporting frame to allow simultaneous angular displacement of the finger units, and a second drive unit coupled to the supporting frame to adjust orientation angles between the finger units, wherein each of the finger units includes an intermediation member to be moved vertically relative to the base plate by the first drive unit, a grip member to grip an object by being moved in a horizontal direction of the base plate according to the vertical movement of the intermediation member, and a connection member to convert the vertical movement of the intermediation member into the horizontal movement of the grip member.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
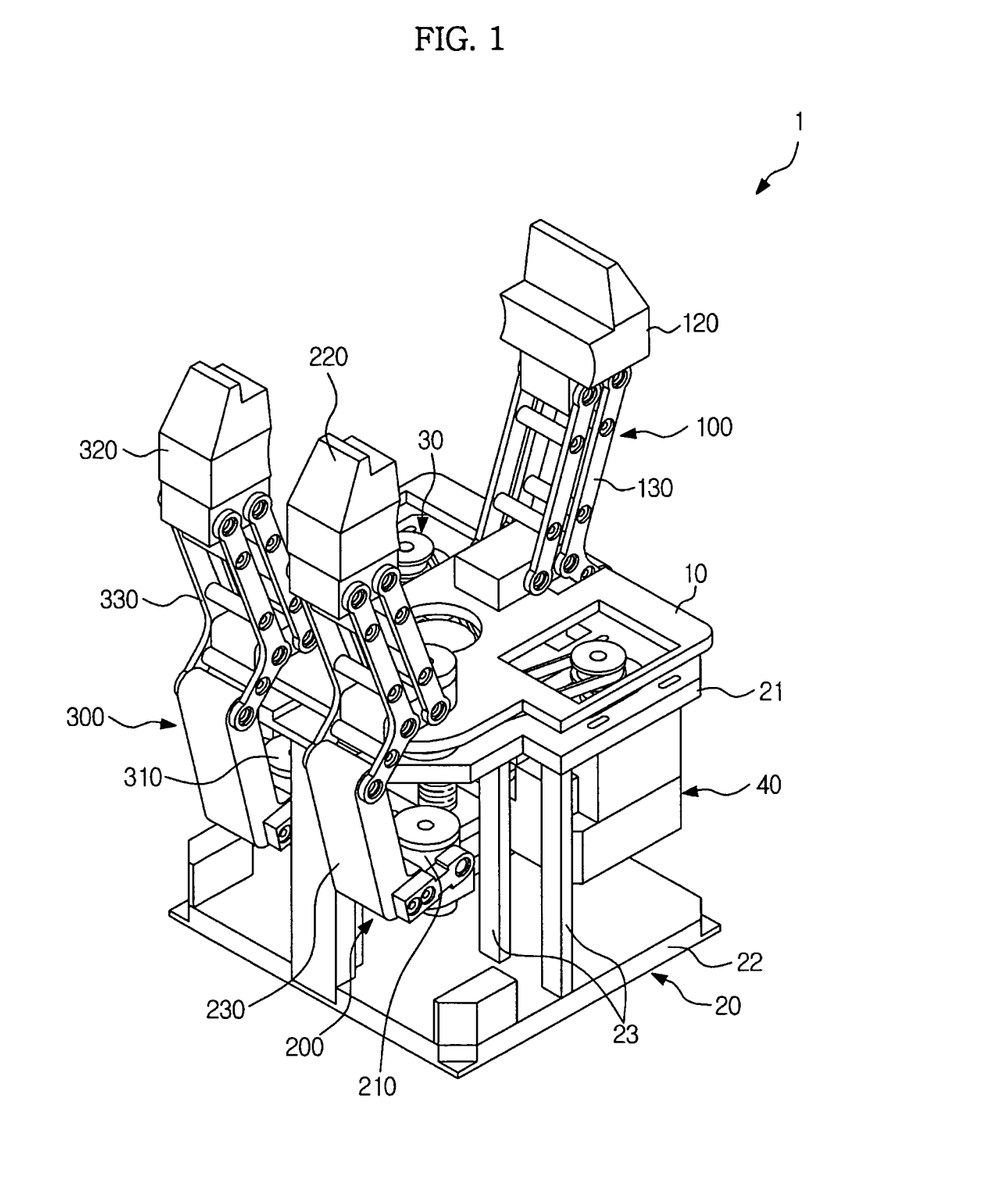
FIG. 1 is a perspective view illustrating an industrial gripper with multiple degrees of freedom according to an embodiment.
Figure 2:
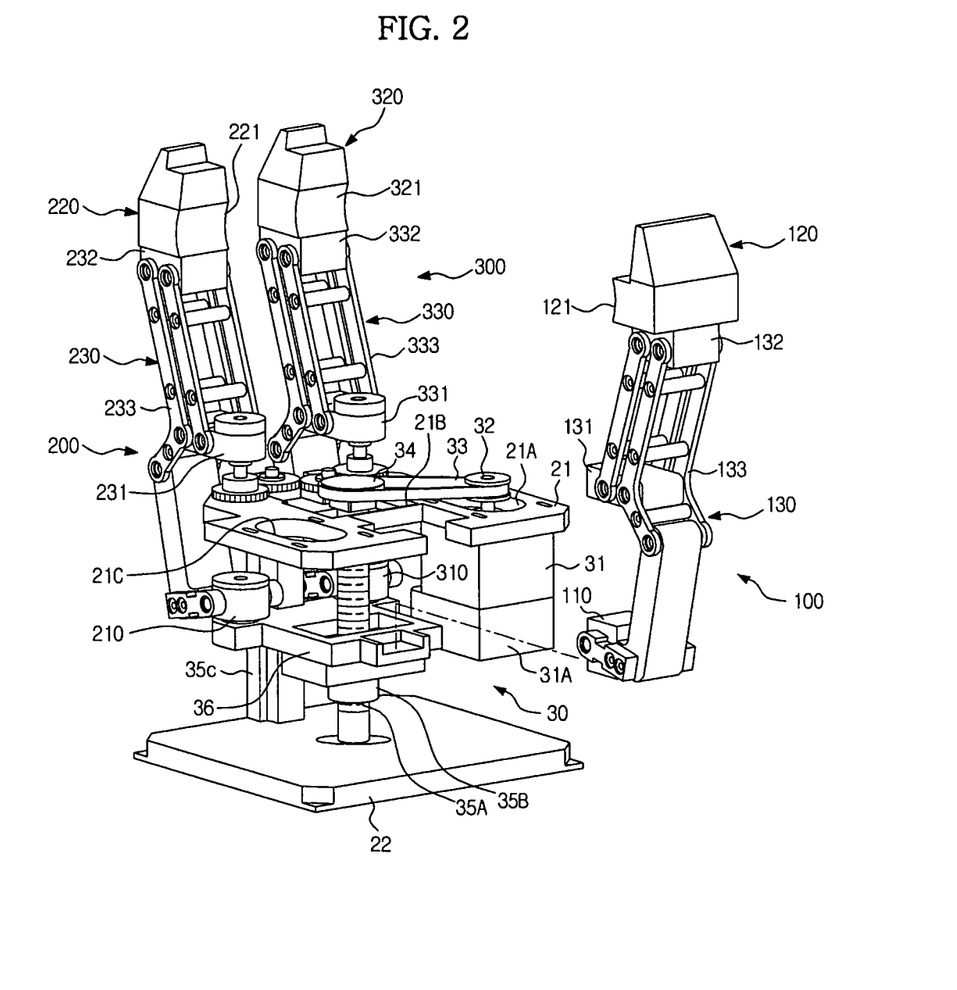
FIG. 2 is a perspective view illustrating a state in which a finger unit is separated from the industrial gripper with multiple degrees of freedom illustrated in FIG. 1.

FIG. 1 is a perspective view illustrating an industrial gripper with multiple degrees of freedom according to an embodiment, and FIG. 2 is a perspective view illustrating a state in which a finger unit is separated from the industrial gripper with multiple degrees of freedom illustrated in FIG. 1.

As illustrated in FIGS. 1 and 2, the industrial gripper 1 with multiple degrees of freedom according to the embodiment includes a base plate 10, a plurality of finger units 100, 200 and 300 to be moved respectively relative to the base plate 10, a supporting unit 20 to support the plurality of finger units 100, 200 and 300 to allow the plurality of finger units 100, 200 and 300 to be moved relative to the base plate 10, a first drive unit 30 to cause angular displacement of the plurality of finger units 100, 200 and 300 on the basis of the base plate 10, and a second drive unit 40 to adjust orientation angles between the plurality of finger units 100, 200 and 300.

In the industrial gripper 1 with multiple degrees of freedom, the plurality of finger units 100, 200 and 300 are moved relative to the base plate 10 via the first drive unit 30 and the second drive unit 40, thus acting to grip an object.

The plurality of finger units 100, 200 and 300 may include a first finger unit 100 that is kept at a fixed position of the base plate 10, and a second finger unit 200 and a third finger unit 300 that are rotatable about a specific axis on the base plate 10. The number of the second finger unit 200 and the third finger unit 300 may increase as occasion demands, and the first finger unit 100 may be modified to be movable.

The first to third finger units 100, 200 and 300 are installed to the supporting unit 20 so as to be moved relative to the base plate 10. The supporting unit 20 includes a first supporting frame 21 installed beneath the base plate 10 so that the first to third finger units 100, 200 and 300 are installed thereto, a second supporting frame 22 placed on the floor, and supporting posts 23 to maintain a constant gap between the first supporting frame 21 and the second supporting frame 22.

The first finger unit 100, the second finger unit 200 and the third finger unit 300 respectively include intermediation members 110, 210 and 310, grip members 120, 220 and 320 and connection members 130, 230 and 330. The respective grip members 120, 220 and 320 of the first to third finger units 100, 200 and 300 include grip pieces 121, 221 and 321 to grip the object. In addition, the respective connection members 130, 230 and 330 of the first to third finger units 100, 200 and 300 include fixing portions 131, 231 and 331, opposite portions 132, 232 and 332 and link portions 133, 233 and 333.

Here, the first to third finger units 100, 200 and 300 have the same shape. Accordingly, for convenience of description, descriptions of to the first finger unit 100 and the second finger unit 200 are substituted by the following description of the third finger unit 300 except for specially mentioned cases.

Figure 3:
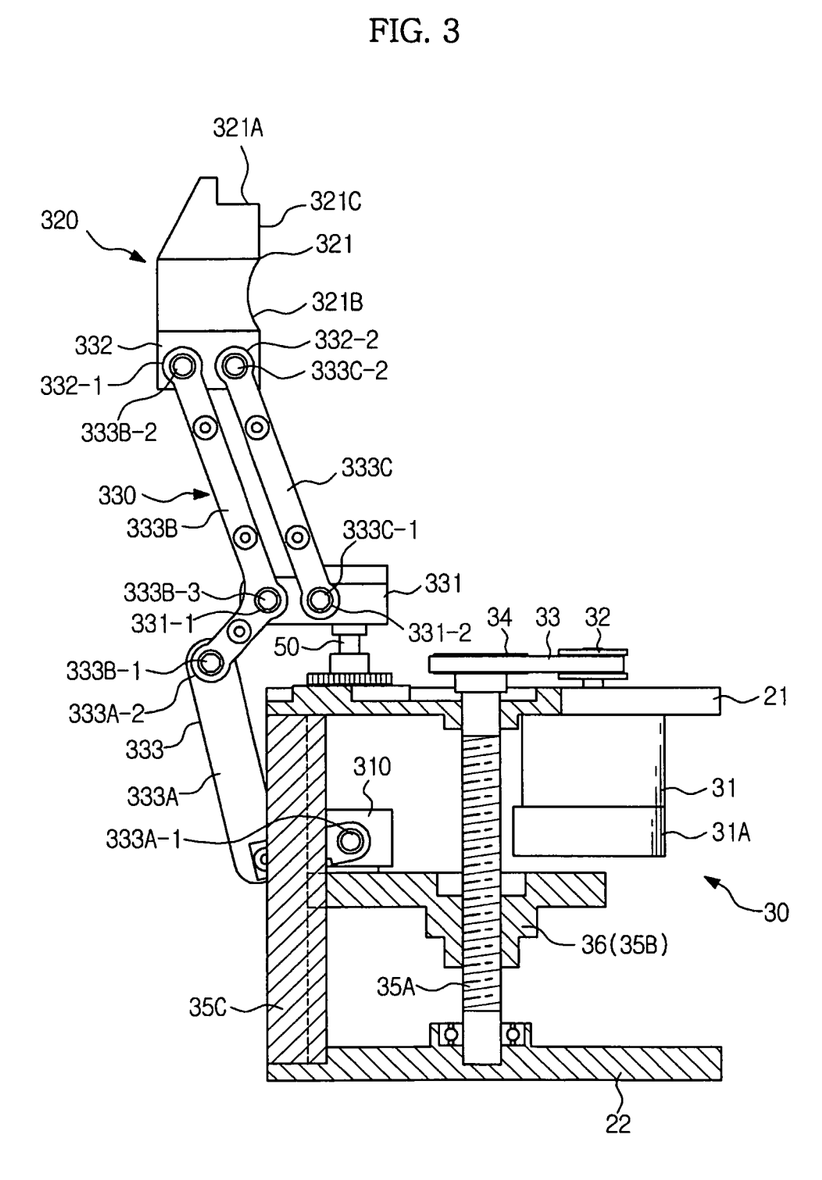
FIG. 3 is a sectional view illustrating a third finger unit included in the industrial gripper with multiple degrees of freedom according to an embodiment.
Figure 4:
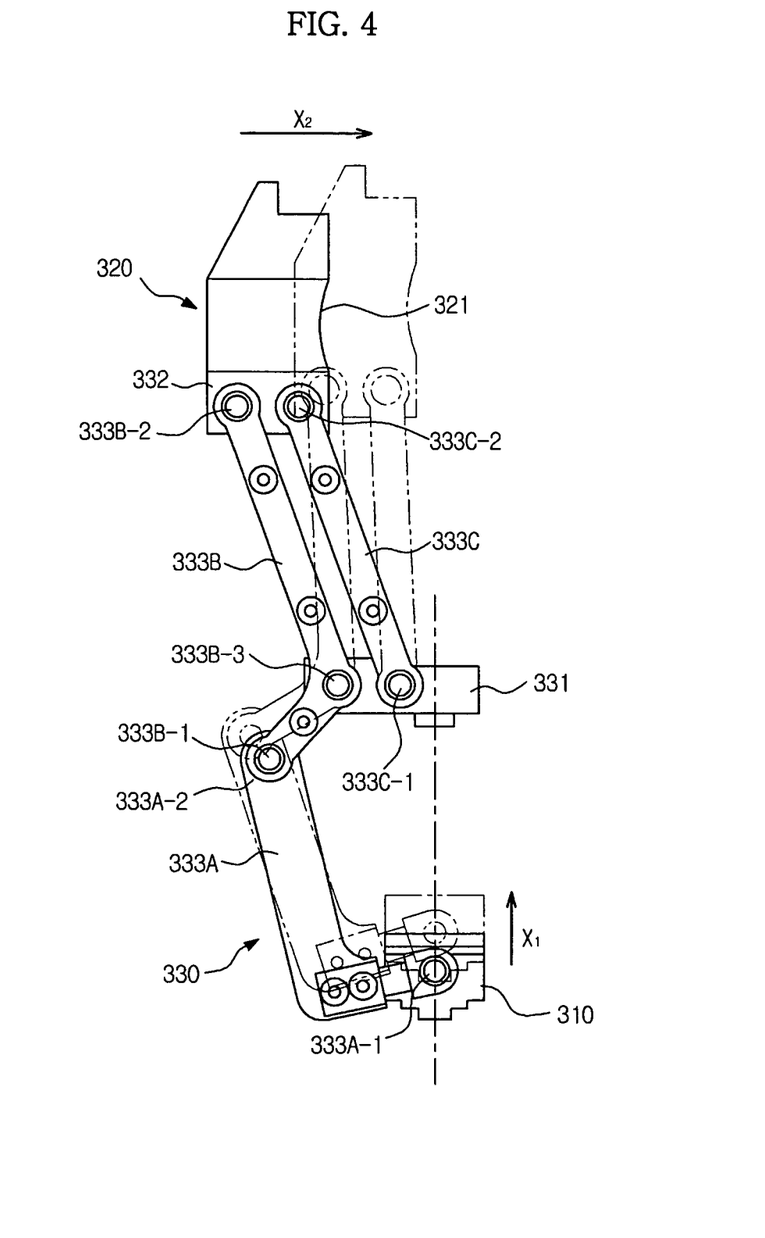
FIG. 4 is a sectional view illustrating angular displacement of the third finger unit illustrated in FIG. 3 caused by operation of a first drive unit included in the industrial gripper with multiple degrees of freedom.

FIG. 3 is a sectional view illustrating the third finger unit of the industrial gripper with multiple degrees of freedom illustrated in FIG. 2, and FIG. 4 is a sectional view illustrating angular displacement of the third finger unit illustrated in FIG. 3 caused by operation of the first drive unit of the industrial gripper with multiple degrees of freedom.

As illustrated in FIGS. 3 and 4, the third finger unit 300 includes the intermediation member 310 adapted to be moved in a first direction $X_1$ by drive power of the first drive unit 30, the grip member 320 to grip the object by being moved in a second direction $X_2$ different from the first direction $X_1$ of the intermediation member 310, and the connection member 330 to connect the intermediation member 310 and the grip member 320 to each other so as to convert the movement of the intermediation member 310 in the first direction $X_1$ into the movement of the grip member 320 in the second direction $X_2$.

The intermediation member 310 is coupled to the first drive unit 30 and is moved in the first direction $X_1$ upon receiving drive power of the first drive unit 30.

The grip member 320 includes the grip piece 321, which serves as a finger tip joint to directly grip the object. The grip piece 321 is detachably provided, so that various shapes of grip pieces may be used in response to a shape of the object.

For example, the grip piece 321 may include a first surface 321A defining a stepped upper surface, a second surface 321B defining a circular side surface near a lower end thereof, and a third surface 321C defining a flat side surface connecting the first surface 321A and the second surface 321B to each other.

The grip member 320 is coupled to the intermediation member 310 via the connection member 330. The connection member 330 includes the fixing portion 331 fixed to the first supporting frame 21, the opposite portion 332 coupled to the grip member 320 so as to be opposite to the fixing portion 331, and the link portion 333 consisting of a plurality of links to connect the intermediation member 310, the fixing portion 331 and the opposite portion 332 to one another.

The fixing portion 331 is coupled to a second rotating shaft 50 of the second drive unit 40 on the first supporting frame 21. The fixing portion 331 serves as a center axle upon pivotal motion of the link portion 333. To this end, the fixing portion 331 includes a first point 331-1 and a second point 331-2 to be coupled respectively to the link portion 333.

The opposite portion 332 is installed beneath the grip member 320 so as to be opposite to the fixing portion 331. The opposite portion 332 includes a first point 332-1 and a second point 332-2 to be coupled respectively to the link portion 333.

The link portion 333 includes a first drive link 333A, a second drive link 333B, and a driving-assistant link 333C.

One end 333A-1 of the first drive link 333A is coupled to the intermediation member 310 so that the first drive link 333A is moved together with the intermediation member 310. The other end 333A-2 of the first drive link 333A is coupled to the second drive link 333B located above the first drive link 333A. The first drive link 333A has an approximately L-shaped form and is moved up and down similar to the movement of the intermediation member 310 in the first direction $X_1$.

One end 333B-1 of the second drive link 333B is coupled to the first drive link 333A, and the other end 333B-2 of the second drive link 333B is coupled to the first point 332-1 of the opposite portion 332. The second drive link 333B has an approximately L-shaped form, so that an angled portion 333B-3 between both the ends 333B-1 and 333B-2 of the second drive link 333B is coupled to the first point 331-1 of the fixing portion 331.

The driving-assistant link 333C is arranged parallel to the second drive link 333B. One end 333C-1 of the driving-assistant link 333C is coupled to the second point 331-2 of the fixing portion 331, and the other end 333C-2 of the driving-assistant link 333C is coupled to the second point 332-2 of the opposite portion 332.

The second drive link 333B, the driving-assistant link 333C, the fixing portion 331, and the opposite portion 332 of the third finger unit 300 realize a parallelogram 4-bar link configuration. More specifically, the second drive link 333B and the driving-assistant link 333C act to move the grip member 320, coupled to the opposite portion 332, in the second direction $X_2$ on the basis of the fixing portion 331 while being kept parallel to each other, thereby allowing the third finger unit 300 to be angularly displaced relative to the base plate 10.

As described above, simultaneously with the third finger unit 300, the first finger unit 100 and the second finger unit 200 move the grip pieces 121 and 221 of the grip members 120 and 220 toward the object in the second direction $X_2$, thus allowing the grip pieces 121 and 221 to grip the object.

In the meantime, the second direction $X_2$ corresponds to a horizontal direction of the base plate 10, along which the finger units are moved to grip the object placed on the center of the base plate 10.

Next, the first drive unit of the industrial gripper with multiple degrees of freedom according to the embodiment of the present invention will be described with reference to FIGS. 2 and 3.

As illustrated in FIGS. 2 and 3, the first drive unit 30 provided in the industrial gripper 1 with multiple degrees of freedom according to the embodiment of the present invention includes a first drive motor 31, and first power transmission members 32 to 36 coupled to the first drive motor 31. Here, the first drive motor may be substituted by an electric motor, a pneumatic cylinder, or a hydraulic cylinder, and may exhibit the same function despite structural changes related to which a drive source is employed. The following description relates to adoption of an electric motor.

The first drive motor 31 is fixed to a lower surface of the first supporting frame 21. The first drive motor 31 is coupled with the first power transmission members 32 to 36 including a first-A pulley 32, a first belt 33, a first-B pulley 34, a ball screw assembly 35, and a connection frame 36.

The first-A pulley 32 passes through a first-A hole 21A of the first supporting frame 21 and is coupled to the first drive motor 31. The first-A pulley 32 is connected to the first-B pulley 34 via the first belt 33. Accordingly, if the first drive motor 31 is driven, drive power of the first drive motor 31 is transmitted to the first-B pulley 34 through the first-A pulley 32 and the first belt 33.

The first-B pulley 34 passes through a first-B hole 21B of the first supporting frame 21 and is coupled to the ball screw assembly 35. The ball screw assembly 35 includes a ball screw 35A connected to the first-B pulley 34, a ball nut 35B screwed to the ball screw 35A, and a linear guide 35C coupled to the connection frame 36 while being arranged parallel to the ball screw 35A.

The ball nut 35B is coupled to the linear guide 35C via the connection frame 36, so that rotational motion of the ball screw 35A may be converted into linear motion of the ball nut 35B in the first direction $X_1$.

More specifically, if drive power of the first drive motor 31 is transmitted to the first-B pulley 34, the ball screw 35A connected to the first-B pulley 34 is rotated, causing the ball nut 35B to be linearly moved in the first direction $X_1$ along the ball screw 35A.

As a result, if the first drive motor 31 is driven, the ball screw 35A is rotated via the first-A pulley 32, the first belt 33 and the first-B pulley 34, and the ball nut 35B is linearly moved in the first direction $X_1$ along the ball screw 35A. In this case, the linear guide 35C assures accurate linear motion of the connection frame 36 in the first direction $X_1$.

The connection frame 36, as illustrated in FIG. 2, is coupled with the above described respective intermediation members 110, 210 and 310 of the first to third finger units 100, 200 and 300, so that the first to third finger units 100, 200 and 300 may be angularly displaced relative to the base plate 10.

More specifically, the first to third finger units 100, 200 and 300 may grip the object using the linear motion of the connection frame 36 in the first direction $X_1$. In this case, the grip pieces 121, 221 and 321 of the first to third finger units 100, 200 and 300, which are oriented perpendicular to the base plate 10, may be moved toward the object while being kept in a horizontal direction of the base plate 10.

Figure 5:
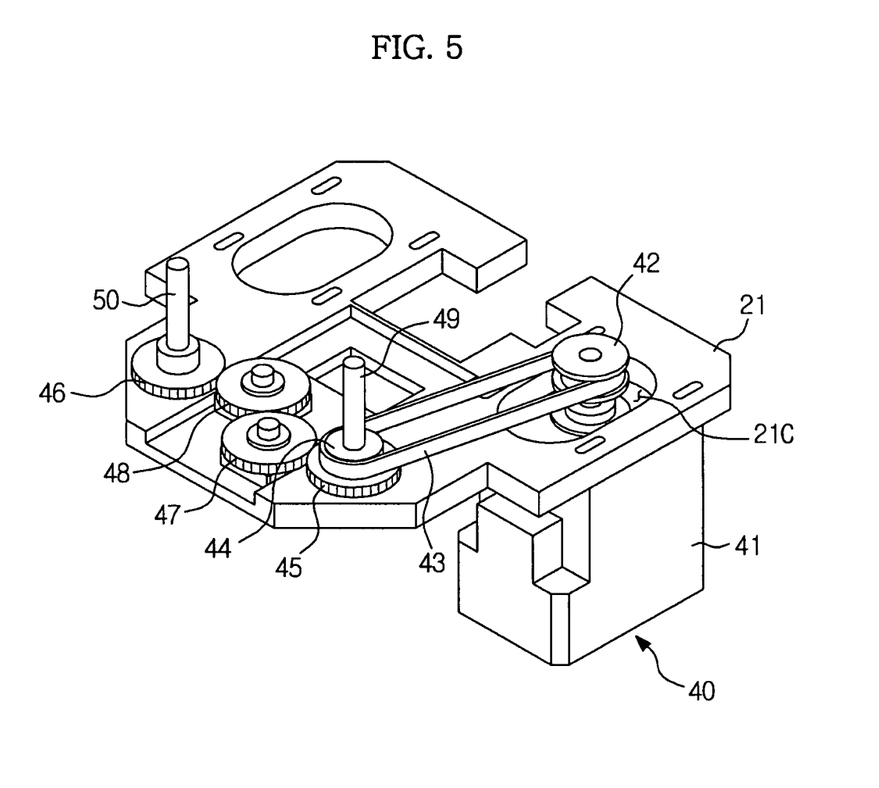
FIG. 5 is a perspective view illustrating a second drive unit included in the industrial gripper with multiple degrees of freedom according to an embodiment.

Next, the second drive unit of the industrial gripper with multiple degrees of freedom according to the embodiment of the present invention will be described with reference to FIGS. 2 and 5. FIG. 5 is a perspective view illustrating the second drive unit of the industrial gripper with multiple degrees of freedom according to an embodiment.

As illustrated in FIGS. 2 and 5, the second drive unit 40 provided in the industrial gripper 1 with multiple degrees of freedom according to the embodiment is used to adjust orientation angles between the first to third finger units 100, 200 and 300. The second drive unit 40 includes a second drive motor 41, and second power transmission members 42 to 50 to transmit drive power of the second drive motor 41 to the second and third finger units 200 and 300. Similar to the first drive motor, the second drive motor may be substituted by an electric motor, a pneumatic cylinder, or a hydraulic cylinder, and may exhibit the same function despite structural changes related to which a drive source is employed. The following description relates to adoption of an electric motor.

The second drive motor 41 is fixed to the lower surface of the first supporting frame 21. The second drive motor 41 is connected to the second power transmission members 42 to 50, so as to transmit drive power of the second drive motor 41 to the fixing portion 231 of the second finger unit 200 and the fixing portion 331 of the third finger unit 300.

The second power transmission members 42 to 50 include a second-A pulley 42, a second belt 43, a second-B pulley 44, a driving gear 45, a driven gear 46, a first intermediation gear 47, a second intermediation gear 48, a first rotating shaft 49 and a second rotating shaft 50.

The second-A pulley 42 passes through a second-A hole 21C of the first supporting frame 21 and is coupled to the second drive motor 41. The second-A pulley 42 is connected to the second-B pulley 44 via the second belt 43. Accordingly, if the second drive motor 41 is driven, drive power of the second drive motor 41 is transmitted to the second-B pulley 44 through the second-A pulley 42 and the second belt 43.

The second-B pulley 44 is installed to the first rotating shaft 49 having the same rotation center as the second-B pulley 44. The driving gear 45 is coupled to the first rotating shaft 49 with the second-B pulley 44 interposed therebetween.

The first intermediation gear 47 is engaged with the driving gear 45 and in turn, the second intermediation gear 48 is engaged with the first intermediation gear 47. Also, the second intermediation gear 48 is engaged with the driven gear 46. The driven gear 46 is coupled to the second rotating shaft 50 having the same rotation center as the driven gear 46.

Accordingly, if the driving gear 45 is rotated by the second-B pulley 44, the driven gear 46 is rotated via the first and second intermediation gears 47 and 48. In this case, with the above described arrangement of the driving gear 45, the first intermediation gear 47, the second intermediation gear 48 and the driven gear 46, the driving gear 45 and the driven gear 46 have the same rotation angle, but are rotated in opposite directions.

Specifically, the first rotating shaft 49 coupled to the driving gear 45 and the second rotating shaft 50 coupled to the driven gear 46 have the same rotation angle, but are rotated in opposite directions.

In this case, as the fixing portion 231 of the second finger unit 200 is connected to the first rotating shaft 49 and the fixing portion 331 of the third finger unit 300 is connected to the second rotating shaft 50, the second finger unit 200 and the third finger unit 300 have the same rotation angle, but are rotated in opposite directions. In this way, orientation angles of the second finger unit 200 and the third finger unit 300 may be adjusted.

Accordingly, the industrial gripper 1 with multiple degrees of freedom according to the embodiment of the present invention may act to move the plurality of finger units 100, 200 and 300 relative to the base plate 10 via the first drive unit 30 and the second drive unit 40, thereby allowing the plurality of finger units 100, 200 and 300 to stably grip the object.

In the industrial gripper 1 with multiple degrees of freedom according to the embodiment, a grip force thereof may be measured from a value of current generated from the first drive motor 31 of the first drive unit 30, rather than installing a sensor to a distal end of the grip piece that comes into contact with the object. If the drive motor is substituted by other drive sources, other physical parameters corresponding to current may be adopted. Measurement of the grip force allows the finger units 100, 200 and 300 to exhibit an appropriate grip force when gripping the object.

To this end, the first drive unit 30 includes a sensing device 31A to monitor current of the first drive motor 31. In the industrial gripper 1 with multiple degrees of freedom, the sensing device 31A may calculate a torque generated by the first drive motor 31 during operation of the first drive unit 30. Therefore, assuming that appropriate grip forces for different objects to be gripped at working places are previously set, the finger units 100, 200 and 300 may be angularly displaced to grip a selected object with an appropriate preset grip force. Accordingly, the grip force of the industrial gripper 1 may be appropriately adjusted to assure stable grip of a high-strength object as well as a low-strength object.

Figure 6:
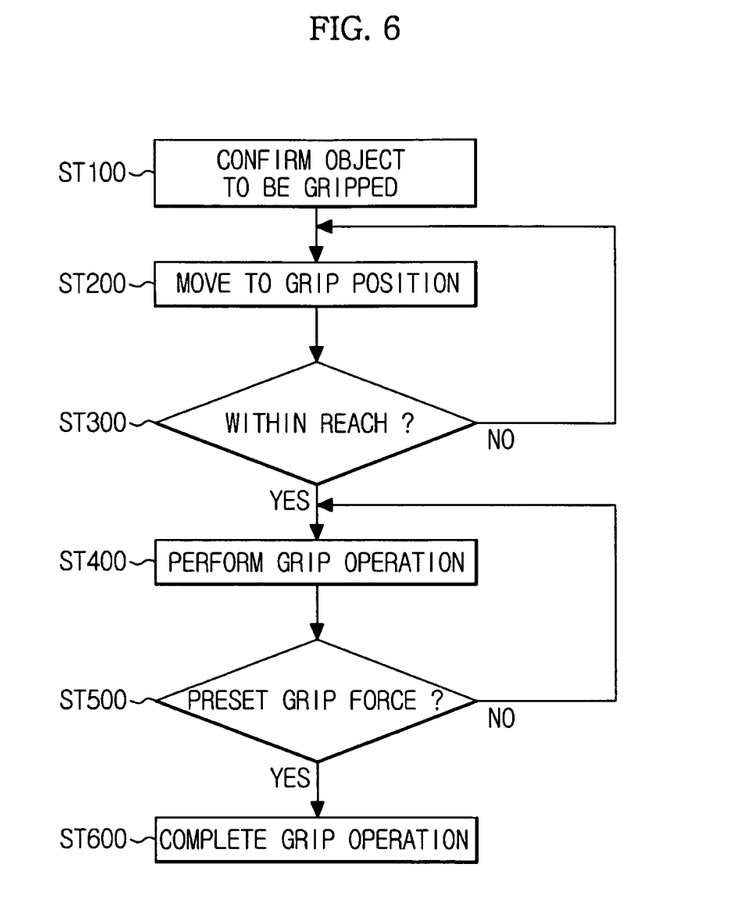
FIG. 6 is a flow chart illustrating an operational sequence of the industrial gripper with multiple degrees of freedom when gripping an object with a preset grip force.

Hereinafter, operation of the industrial gripper 1 with multiple degrees of freedom according to the embodiment of the present invention will be described with reference to FIG. 6.

First, the industrial gripper with multiple degrees of freedom confirms an object to be gripped in operation ST100.

Then, the industrial gripper with multiple degrees of freedom is moved to a grip position in operation ST200.

In operation ST300, the industrial gripper with multiple degrees of freedom determines whether or not the object to be gripped is within reach.

If it is determined, from the result of operation ST300, that the object to be gripped is within reach, the industrial gripper with multiple degrees of freedom performs a grip operation in operation ST400. On the other hand, if it is determined that the object to be gripped is not within reach, operation ST200 is repeated until presence of the object within reach is determined.

Next, in operation ST500, it is determined whether or not the industrial gripper with multiple degrees of freedom exhibits a preset grip force for the object to be gripped.

If it is determined, from the result of operation ST500, that the industrial gripper with multiple degrees of freedom exhibits a preset grip force for the object to be gripped, the grip operation is completed in operation ST600. On the other hand, if it is determined that the industrial gripper with multiple degrees of freedom does not exhibit a preset grip force for the object to be gripped, operation ST400 is repeated until the preset grip force for the object is exhibited.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An industrial gripper with multiple degrees of freedom comprising:
   a base plate;
   at least three finger units to be moved relative to the base plate;
   a supporting unit to support the finger units;
   a first drive unit coupled to the supporting unit to allow simultaneous angular displacement of the finger units toward an object; and
   a second drive unit coupled to the supporting unit to adjust orientation angles between the finger units, wherein each of the finger units includes an intermediation member to be moved in a first direction by the first drive unit, a grip member to grip the object by being moved in a second direction different from the first direction as a movement direction of the intermediation member, and a connection member to convert the first direction movement of the intermediation member into the second direction movement of the grip member, and wherein the connection member includes a fixing portion installed to the supporting unit, an opposite portion installed to the grip member so as to be opposite to the fixing portion, and a link portion having a plurality of links to connect the intermediation member, the fixing portion and the opposite portion to one another.

2. The industrial gripper with multiple degrees of freedom according to claim 1, wherein:

the first direction is a vertical direction of the base plate; and the second direction is a horizontal direction of the base plate.

3. The industrial gripper with multiple degrees of freedom according to claim 2, wherein the grip member includes a grip piece to be moved by the first drive unit while being kept in the horizontal direction of the base plate.

4. The industrial gripper with multiple degrees of freedom according to claim 1, wherein the link portion includes:

a first drive link coupled to the intermediation member;

a second drive link having one end coupled to one end of the first drive link, an other end coupled to a first point of the opposite portion and an angled portion coupled to a first point of the fixing portion; and a driving-assistant link having one end coupled to a second point of the fixing portion and an other end coupled to a second point of the opposite portion.

5. The industrial gripper with multiple degrees of freedom according to claim 4, wherein the second drive link, the driving-assistant link, the fixing portion and the opposite portion define a parallelogram 4-bar link structure.

6. An industrial gripper with multiple degrees of freedom comprising:

a base plate;

at least three finger units to be moved relative to the base plate;

a supporting unit to support the finger units;

a first drive unit coupled to the supporting unit to allow simultaneous angular displacement of the finger units toward an object; and a second drive unit coupled to the supporting unit to adjust orientation angles between the finger units, wherein each of the finger units includes an intermediation member to be moved in a first direction by the first drive unit, a grip member to grip the object by being moved in a second direction different from the first direction as a movement direction of the intermediation member and a connection member to convert the first direction movement of the intermediation member into the second direction movement of the grip member, and wherein the first drive unit includes a first drive motor fixed to the supporting unit; and a first power transmission member to transmit drive power of the first drive motor to the intermediation member.

7. The industrial gripper with multiple degrees of freedom according to claim 6, wherein the first drive unit further includes a sensing device installed to the first drive motor to monitor current of the first drive motor.

8. The industrial gripper with multiple degrees of freedom according to claim 6, wherein the first drive motor includes at least one of an electric motor, a pneumatic cylinder and a hydraulic cylinder.

9. The industrial gripper with multiple degrees of freedom according to claim 6, wherein the first power transmission member includes:

a first-A pulley coupled to the first drive motor;

a first-B pulley coupled to the first-A pulley via a first belt;

a ball screw assembly coupled to the first-B pulley; and a connection frame coupled to the ball screw assembly to transmit drive power for the first direction movement to the intermediation member.

10. The industrial gripper with multiple degrees of freedom according to claim 9, wherein the ball screw assembly includes:

a ball screw coupled to the first-B pulley;

a ball nut screwed to the ball screw; and a linear guide coupled to the connection frame while being arranged parallel to the ball screw.

11. An industrial gripper with multiple degrees of freedom comprising:

a base plate;

at least three finger units to be moved relative to the base plate;

a supporting unit to support the finger units;

a first drive unit coupled to the supporting unit to allow simultaneous angular displacement of the finger units toward an object; and a second drive unit coupled to the supporting unit to adjust orientation angles between the finger units, wherein each of the finger units includes an intermediation member to be moved in a first direction by the first drive unit, a grip member to grip the object by being moved in a second direction different from the first direction as a movement direction of the intermediation member, and a connection member to convert the first direction movement of the intermediation member into the second direction movement of the grip member, and wherein the second drive unit includes a second drive motor installed to the supporting unit; and a second power transmission member to transmit drive power of the second drive motor to two finger units of the finger units.

12. The industrial gripper with multiple degrees of freedom according to claim 11, wherein the second drive motor includes at least one of an electric motor, a pneumatic cylinder and a hydraulic cylinder.

13. The industrial gripper with multiple degrees of freedom according to claim 11, wherein the second power transmission member includes:

a second-A pulley coupled to the second drive motor;

a second-B pulley coupled to the second-A pulley via a second belt;

a first rotating shaft coupled to a fixing portion of any one finger unit and having the same rotation center as the second-B pulley;

a driving gear coupled to the second-B pulley;

a driven gear connected to the driving gear via an intermediation gear; and a second rotating shaft coupled to a fixing portion of the other finger unit and having the same rotation center as the driven gear.

14. An industrial gripper with multiple degrees of freedom comprising:

a base plate;

at least three finger units to be moved relative to the base plate;
a supporting unit to support the finger units;
a first drive unit coupled to the supporting unit to allow simultaneous angular displacement of the finger units toward an object; and
a second drive unit coupled to the supporting unit to adjust orientation angles between the finger units,
wherein each of the finger units includes an intermediation member to be moved in a first direction by the first drive unit, a grip member to grip the object by being moved in a second direction different from the first direction as a movement direction of the intermediation member, and a connection member to convert the first direction movement of the intermediation member into the second direction movement of the grip member,
wherein the first direction is a vertical direction of the base plate, the second direction is a horizontal direction of the base plate, and the grip member includes a grip piece to be moved by the first drive unit while being kept in the horizontal direction of the base plate, and
wherein the grip piece includes
   a first surface defining an upper stepped surface;
   a second surface defining a circular side surface near a lower end thereof; and
   a third surface defining a flat side surface connecting the first surface and the second surface to each other.

\* \* \* \* \*

UNITED STATES PATENT AND TRADEMARK OFFICE
CERTIFICATE OF CORRECTION

PATENT NO.         : 8,424,942 B2                                        Page 1 of 1
APPLICATION NO.    : 12/926869
DATED              : April 23, 2013
INVENTOR(S)        : Hahn Park et al.

It is certified that error appears in the above-identified patent and that said Letters Patent is hereby corrected as shown below:

Title Page: Item 75, Line 4, Delete "Yongij-si" and insert -- Yongin-si --, therefor.

Signed and Sealed this
Twentieth Day of August, 2013

Teresa Stanek Rea
*Acting Director of the United States Patent and Trademark Office*